(12) United States Patent
Shan et al.

(10) Patent No.: US 8,160,626 B2
(45) Date of Patent: Apr. 17, 2012

(54) APPARATUS AND METHOD FOR ENQUIRING CHANNEL CONDITION INFORMATION IN COGNITIVE RADIO WIRELESS COMMUNICATION SYSTEM

(75) Inventors: Cheng Shan, Suwon-si (KR); Eun-Taek Lim, Suwon-si (KR); Jung-Soo Woo, Suwon-si (KR); Geun-Ho Lee, Suwon-si (KR); Sang-Bum Kim, Seoul (KR); Yong-Ho Park, Cheonan-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 420 days.

(21) Appl. No.: 12/437,155

(22) Filed: May 7, 2009

(65) Prior Publication Data

US 2009/0280748 A1    Nov. 12, 2009

(30) Foreign Application Priority Data

May 8, 2008  (KR) .................. 10-2008-0043095
Jun. 3, 2008  (KR) .................. 10-2008-0052240

(51) Int. Cl.
*H04B 7/00*       (2006.01)

(52) U.S. Cl. ........ 455/509; 455/525; 455/437; 455/516; 455/501; 375/138; 375/133; 375/220

(58) Field of Classification Search .................. 455/525, 455/436, 437, 450, 524, 522, 516, 501, 504, 455/517, 449; 375/138, 133, 220
See application file for complete search history.

(56) References Cited

U.S. PATENT DOCUMENTS

| | | | | |
|---|---|---|---|---|
| 6,760,599 B1 * | 7/2004 | Uhlik | ........................... | 455/525 |
| 7,155,171 B2 * | 12/2006 | Ebert et al. | ................. | 455/67.14 |
| 7,266,085 B2 * | 9/2007 | Stine | ............................. | 370/252 |
| 7,738,848 B2 * | 6/2010 | Kwak | ......................... | 455/226.1 |
| 7,869,792 B1 * | 1/2011 | Zhou et al. | .................... | 455/411 |
| 7,983,703 B2 * | 7/2011 | Chu | .............................. | 455/509 |
| 2010/0113077 A1 * | 5/2010 | Lee et al. | ....................... | 455/501 |
| 2010/0311373 A1 * | 12/2010 | Kwak | ......................... | 455/226.2 |

FOREIGN PATENT DOCUMENTS

WO     2007/043827 A1     4/2007

OTHER PUBLICATIONS

Bendov, O, Limits of Fixed Broadband Devices for Interference-Free Operation in the DTV Spectrum, IEEE Transactions on Broadcasting, Dec. 2007, pp. 746-754, vol. 53, Issue 4.

Cha-Sik Leem et al., Making the Best out of Spectral Efficiency; Studies on the Introduction of Open-Spectrum Policy, CrownCom 2008, 3rd International Conference on Cognitive Radio Oriented Wireless Networks and Communications 2008, May 15-17, 2008, pp. 1-4.

* cited by examiner

*Primary Examiner* — Lam T Mai

(74) *Attorney, Agent, or Firm* — Jefferson IP Law, LLP

(57) ABSTRACT

A method of operating a Data Base (DB) server for storing spectrum condition information on a licensed system in a Cognitive Radio (CR)-based wireless communication system and a CR-based wireless communication system are provided. The method includes determining changes in the spectrum condition information on the licensed system, recalculating maximum Equivalent Isotropically Radiated Power (EIRP) allowed for each channel of CR-based devices registered in a list, and transmitting information regarding the recalculated maximum allowed EIRP.

36 Claims, 11 Drawing Sheets

APPARATUS AND METHOD FOR ENQUIRING CHANNEL CONDITION INFORMATION IN COGNITIVE RADIO WIRELESS COMMUNICATION SYSTEM

PRIORITY

This application claims the benefit under 35 U.S.C. §119 (a) of a Korean patent application filed in the Korean Intellectual Property Office on May 8, 2008 and assigned Serial No. 10-2008-0043095 and a Korean patent application filed in the Korean Intellectual Property Office on Jun. 3, 2008 and assigned Serial No. 10-2008-0052240, the entire disclosures of both of which are hereby incorporated by reference.

BACKGROUND OF THE INVENTION

1. Field of the Invention

The present invention relates to a Cognitive Radio (CR)-based wireless communication system. More particularly, the present invention relates to an apparatus and method for enquiring available channel information in a CR-based wireless communication system.

2. Description of the Related Art

With advancements of wireless communication systems, the wireless communication systems are expected to provide various types of services. In addition, high-speed wireless data transmission techniques are required to provide various services with good quality in a reliable manner. Although various systems and schemes have been proposed for the high-speed wireless data transmission techniques, research on the high-speed data transmission techniques has continuously been conducted to transmit data in a faster and more cost effective manner. The wireless communication systems require additional frequency bands to support coexistence with conventional techniques. However, frequency resources are limited, and most of the frequency resources are currently occupied by existing systems.

Even if a frequency resource is occupied by a specific system, a corresponding frequency band is not always used. For this reason, recently, a method has been considered in which a time duration during which the frequency resource is not used is detected to use the frequency resource in the detected time duration. As such, a system devised to perform wireless communication by reusing the frequency resource occupied by the specific system and temporarily unused is referred to as a Cognitive Ratio (CR)-based wireless communication system. For example, a TeleVision (TV) band is defined as a band in which temporarily unused frequency resources are frequently generated. Accordingly, the Institute of Electrical and Electronics Engineers (IEEE) standard 802.22 has been established in order to solve problems and technical issues required to perform wireless communication by using the TV band without having an effect on a TV broadcast system.

The CR-based wireless communication system has to determine transmit power and an operational frequency band without generating interference with a licensed system. Therefore, the CR-based wireless communication system performs a process of recognizing a frequency band in use by the licensed system by utilizing a spectrum sensing function. Thereafter, the CR-based wireless communication system can only select an operational channel. In addition, if a signal of the licensed system is detected by continuous spectrum sensing while communication is performed through the selected operational channel, the CR-based wireless communication system no longer has to use the operational channel.

However, the spectrum sensing function does not guarantee correct recognition on whether a channel is used by the licensed system. In addition, signal detection and processing have to be carried out for a long period of time to perform the spectrum sensing which may result in performance deterioration in the CR-based wireless communication system.

Therefore, a need exists for a method for recognizing whether a channel is used by a licensed system in a CR-based wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for recognizing whether a channel is used by a licensed system in a Cognitive Radio (CR)-based wireless communication system.

Another aspect of the present invention is to provide an apparatus and method for confirming idle channel information by using band scheduling information on a licensed system in a CR-based wireless communication system.

Still another aspect of the present invention is to provide an apparatus and method for enquiring channel condition information to a Data Base (DB) that stores band scheduling information on a licensed system in a CR-based wireless communication system.

Yet another aspect of the present invention is to provide an apparatus and method for tracing variable channel usage information on a licensed system in a CR-based wireless communication system.

A further aspect of the present invention is to provide an apparatus and method for automatically providing channel usage information on a licensed system according to changes in a spectrum condition in a CR-based wireless communication system.

Another aspect of the present invention is to provide an apparatus and method for automatically providing information regarding maximum Equivalent Isotropically Radiated Power (EIRP) allowed for each channel according to changes in a spectrum condition in a CR-based wireless communication system.

Still another aspect of the present invention is to provide an apparatus and method for automatically providing information regarding maximum allowed EIRP for each channel according to changes in a device registration list in a CR-based wireless communication system.

Yet another aspect of the present invention is to provide an apparatus and method for delivering information for managing a device registration list to a DB in a CR-based wireless communication system.

In accordance with an aspect of the present invention, a method for operating a DB server for storing spectrum condition information on a licensed system in a CR-based wireless communication system is provided. The method includes determining changes in the spectrum condition information on the licensed system, recalculating maximum allowed EIRP for each channel of CR-based devices registered in a list, and transmitting information regarding the recalculated maximum allowed EIRP.

In accordance with another aspect of the present invention, a method for operating a Base Station (BS) in a CR-based wireless communication system is provided. The method includes, when the BS is initialized, transmitting a device registration message including information for calculating EIRP of the BS to a DB server, receiving information regarding maximum allowed EIRP for each channel of the BS from the DB server, and selecting at least one operational channel by using the information regarding the maximum allowed EIRP for each channel.

In accordance with still another aspect of the present invention, a method for operating an Access Terminal (AT) in a CR-based wireless communication system is provided. The method includes controlling transmit power according to first information regarding maximum allowed EIRP for each channel and received at initial access, receiving second information regarding maximum allowed EIRP for each channel without an additional request, and controlling transmit power according to the second information regarding the maximum allowed EIRP for each channel.

In accordance with yet another aspect of the present invention, a DB server apparatus for storing spectrum condition information on a licensed system in a CR-based wireless communication system is provided. The apparatus includes a controller for determining changes in the spectrum condition information on the licensed system, a calculator for recalculating maximum allowed EIRP for each channel of CR-based devices registered to a list, and a communicator for transmitting information regarding the recalculated maximum allowed EIRP for each channel.

In accordance with a further aspect of the present invention, an apparatus for operating a BS in a CR-based wireless communication system is provided. The apparatus includes a DB communicator for transmitting a device registration message including information for calculating EIRP of the BS to a DB server when the BS is initialized, a processor for confirming information regarding maximum allowed EIRP for each channel of the BS from the DB server, and a manager for selecting at least one operational channel by using the information regarding the maximum allowed EIRP for each channel.

In accordance with another aspect of the present invention, an AT apparatus in a CR-based wireless communication system is provided. The apparatus includes a controller for controlling transmit power according to first information regarding maximum allowed EIRP for each channel and received at initial access, and a communicator for receiving second information regarding maximum allowed EIRP for each channel without an additional request, wherein the controller controls transmit power according to the second information regarding maximum allowed EIRP for each channel.

Other aspects, advantages and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, a technique for recognizing available channels in a Cognitive Radio (CR)-based wireless communication system will be described. Although an Orthogonal Frequency Division Multiplexing (OFDM)/Orthogonal Frequency Division Multiple Access (OFDMA)-based wireless system will be described hereinafter as an example, the present invention may also equally apply to other types of wireless communication systems.

Figure 1:
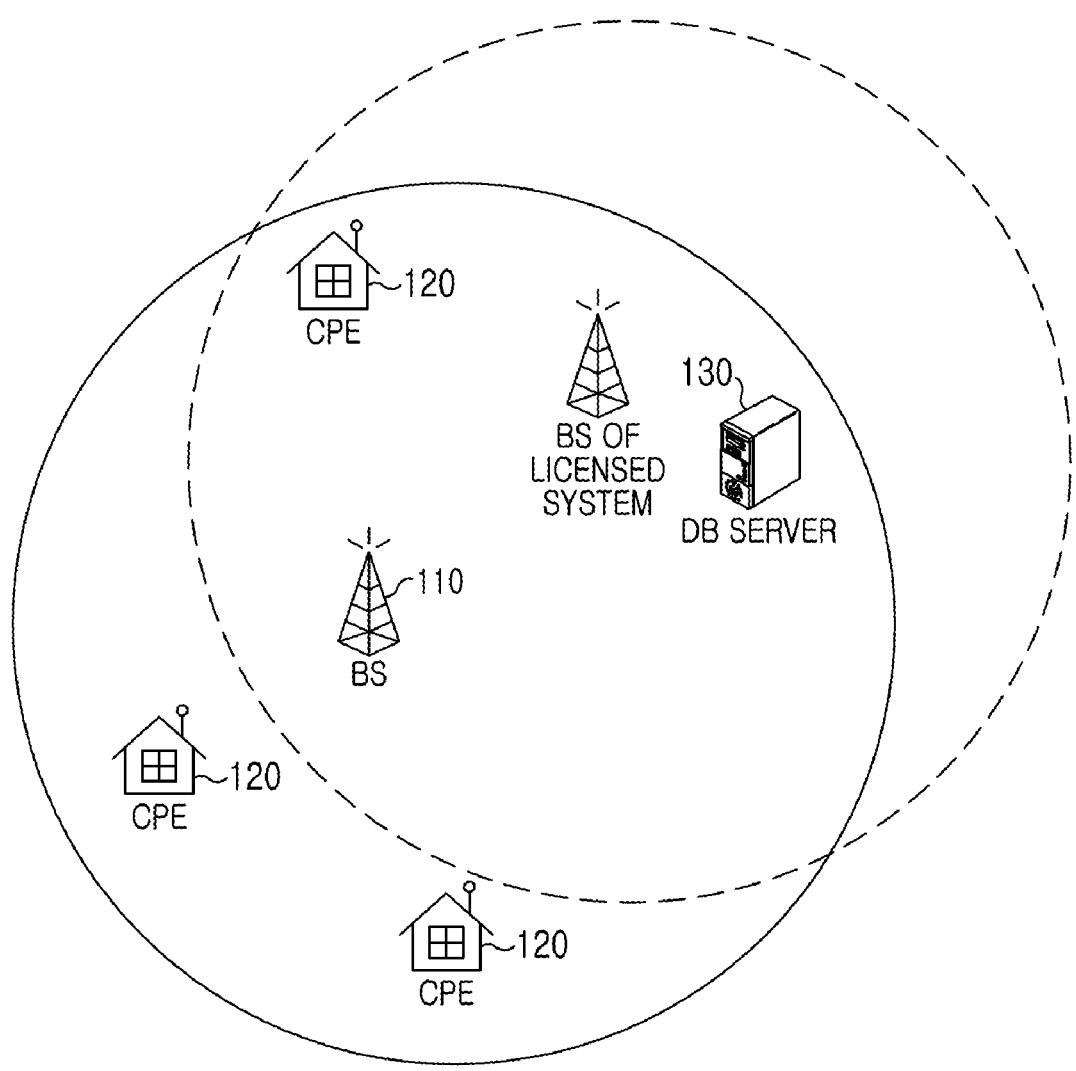
FIG. 1 is a schematic view illustrating a structure of a Cognitive Radio (CR)-based wireless communication system according to an exemplary embodiment of the present invention.

FIG. 1 is a schematic view illustrating a structure of a CR-based wireless communication system according to an exemplary embodiment of the present invention.

Referring to FIG. 1, the CR-based wireless communication system includes a Base Station (BS) 110, Consumer Premise Equipments (CPEs) 120 and a Data Base (DB) server 130. The CR-based wireless communication system coexists with a licensed system. The CPE may also be referred to as a Mobile Station (MS), an Access Terminal (AT) and the like.

The BS 110 and the CPEs 120 perform communication through a wireless channel and have a spectrum sensing function. Therefore, the BS 110 and the CPEs 120 recognize an available band, i.e., a band which is not used by the licensed system, by using the spectrum sensing function, and thereafter configure an operational channel. The BS 110 and the CPEs 120 then perform communication through the operational channel.

More particularly, the BS 110 and the CPEs 120 minimize interference with the licensed system by using licensed system's channel occupation information provided from the DB server 130 and Equivalent Isotropically Radiated Power (EIRP) information on each of the BS 110 and the CPEs 120. The EIRP is a criterion for representing output performance of a wireless communication device. More specifically, the EIRP is a value for representing signal power measured from an outside transmitter, and may differ depending on an antenna gain of the transmitter and a difference of system loss even if the same transmit power is used.

The DB server 130 stores at least one piece of information among band usage scheduling information on the licensed system, a usage frequency band range, a transmission start/end time, a geo-location of the transmitter, transmission EIRP of the transmitter, antenna-related information on the transmitter (e.g., an antenna height, an antenna directivity and a directivity pattern), and a Signal to Interference Ratio (SIR) in a guaranteed region. Further, the DB server 130 provides maximum allowed EIRP information and channel occupation information on the licensed system at the request of the BS 110. In an exemplary implementation, a format of the maximum allowed EIRP information may vary. According to an exemplary embodiment of the present invention, the maximum allowed EIRP information may have at least one format among analog values of maximum allowed EIRP for each channel, binary values indicating operation availability in each channel, and enumeration values indicating operation availability in each channel and also indicating specific EIRP values. When the enumeration values are used, the operation availability and a mapping relation between the specific EIRP values and the enumeration values may be preset and thus known to the BS 110 and the DB server 130, or may be shared between the BS 110 and the DB server 130. For example, the mapping relation may be defined in a table format as illustrated in Table 1 below.

TABLE 1

| value | Indication |
|---|---|
| 00 | unavailable for any operation |
| 01 | available for maximum 4 W operation |
| 10 | available for maximum 100 W operation |
| 11 | available without transmit power limit |

Table 1 above illustrates an exemplary table configuration when a 2-bit enumeration value is used. However, if more bits may be used for the enumeration value, maximum allowed EIRP information may be exchanged in a relatively detailed manner by increasing the number of types of expressible EIRP values. In an exemplary implementation, one bit may be used such manner that '0' indicates that transmission operation for each channel is unavailable, and '1' indicates that transmit power may be set without limitation of the maximum allowed EIRP. In other words, there may be a method for using indications corresponding to '00' and '11' of Table 1 above.

For this, the DB server 130 and the BS 110 perform communication with each other according to independent protocols. Communication between the DB server 130 and the BS 110 may be either wired communication through a backbone network or wireless communication through a wireless channel. For example, a message for delivering the EIRP information is configured as illustrated in Table 2 below.

TABLE 2

| Name | Description |
|---|---|
| Database_type | The value identifies the type of database for which the query request was directed. E.g.: 0=TV Incumbent Database 1=Part 74 Incumbent Database |
| Status | The value indicates whether a response to query was successfully received. E.g.: SUCCESS, INVALID_REQUEST, TRANSACTION_EXPIRED |
| Geo-location Information | Geo-location of registered device. |
| For(i=1 to Number of Channels Available, i++){ Channel_Number Max_Transmit_EIRP } | List of Available Channel Numbers and corresponding maximum transmit power allowed. |

In Table 2 above, the 'Geo-location Information' field indicates a geo-location of a device for utilizing information regarding EIRP for each channel and included in the message. Thus, the 'Geo-location Information' field is used as device identification information. In an exemplary implementation, in addition to the 'Geo-location Information' field, an additional preset IDentifier (ID), a Media Access Control (MAC) address and the like, may be used as device identification information.

The DB server 130 provides EIRP information on each device by using the message of Table 2 above. The DB server 130 provides the EIRP information in the following cases: 1) when a new CR-based device is registered; 2) when a spectrum condition of the licensed system is changed, and 3) when information on a CR-based device is changed. When the BS 110 recognizes activation of a device in a cell of the BS 110, i.e., when the BS 110 is powered on or an access request is generated from an AT, the BS 110 reports activation of the device to the DB server 130. Accordingly, the DB server 130 registers the device to a list, and then calculates and provides the EIRP information. Further, upon recognizing changes in information required to calculate EIRP of the device in the cell, the BS 110 reports the recognized result to the DB server 130. Accordingly, the DB server 130 updates information on the device, and then calculates and provides the EIRP information. For effective management of the list, upon recognizing deactivation of the device in the cell, i.e., upon occurrence of power-off or access release, the BS 110 reports deactivation of the device to the DB server 130. For example, a message of Table 3 below may be used to report device activation, device information change, and device deactivation.

TABLE 3

| Name | Description |
| --- | --- |
| Database_type | The value identifies the type of database for which the query request was directed. E.g.: 0=TV Incumbent Database 1=Part 74 Incumbent Database |
| Geo-location Information | Geo-location of registered device. |
| Device Type | E.g.: BS, AT, etc |
| Message Type | E.g.: DEV_REG, DEV_UPD, DEV_DEREG |
| if Message Type = DEV_REG or DEV_UPD{ | |
|   Antenna Information | Antenna Height, etc |
|   Possible Channel List | Possible Channels the device is capable of operating on. |
| } | |

In Table 3 above, the 'Geo-location Information' field indicates a geo-location of a device for utilizing information regarding EIRP for each channel and included in the message. Thus, the 'Geo-location Information' field is used as device identification information. In an exemplary implementation, in addition to the 'Geo-location Information' field, an additional preset ID, a MAC address and the like, may be used as the device identification information.

The 'Message Type' field indicates a message usage, and is set to DEVice REGistration (DEV_REG), DEVice UPDate (DEV_UPD), or DEVice DEREGistration (DEV_DEREG) to indicate device activation, device information change, or device deactivation, respectively.

The 'Antenna Information' field and the 'Possible Channel List' field are information related to EIRP calculation. The 'Antenna Information' field may include information, such as antenna height, an antenna directivity, an antenna pattern and the like. The 'Possible Channel List' field may include information indicating an operable channel of a device.

Figure 2:
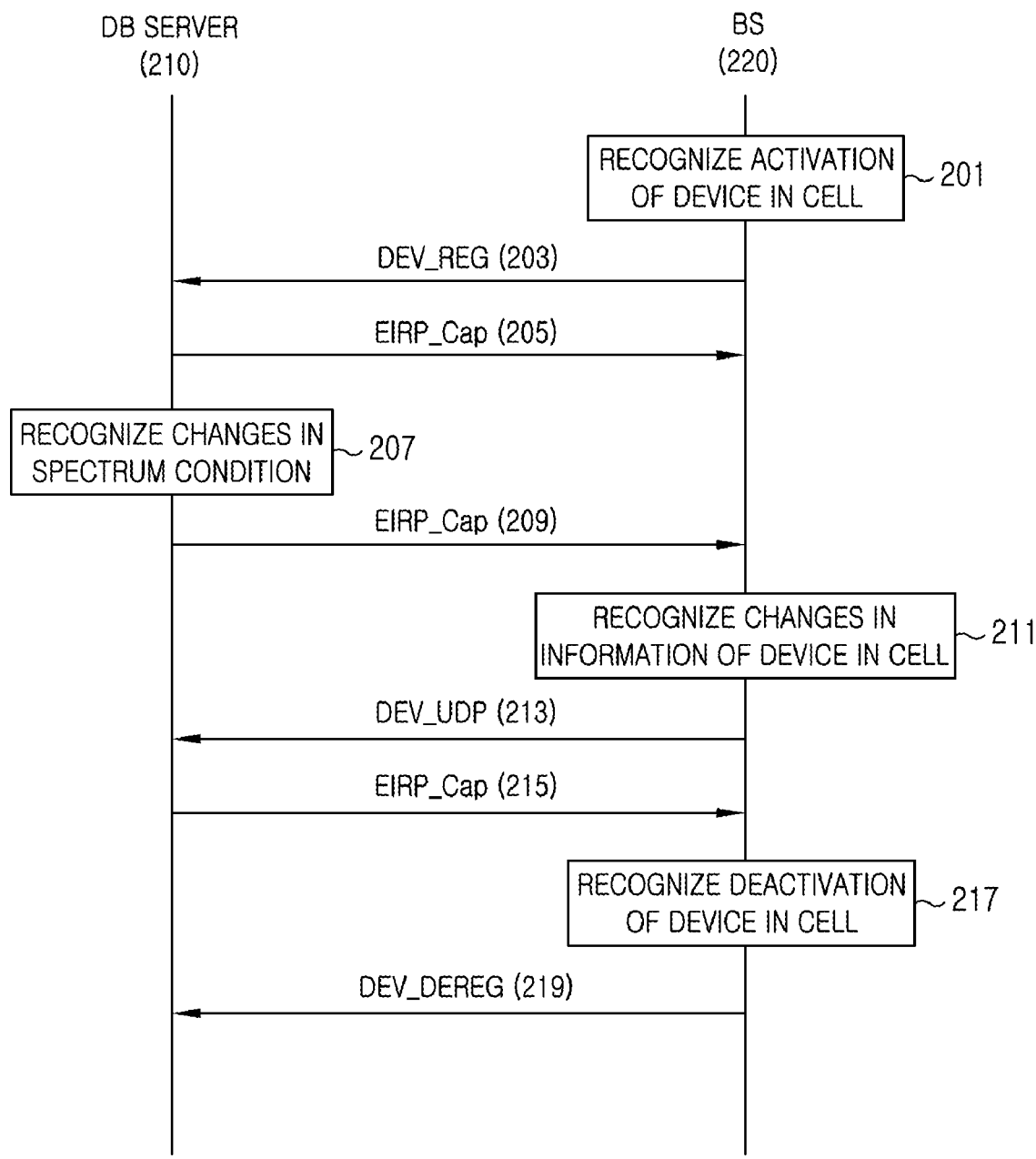
FIG. 2 illustrates signals exchanged between a Data Base (DB) server and a Base Station (BS) in a CR-based wireless communication system according to an exemplary embodiment of the present invention.

FIG. 2 illustrates signals exchanged between a DB server and a BS in a CR-based wireless communication system according to an exemplary embodiment of the present invention.

Referring to FIG. 2, a BS 220 recognizes activation of a device in a cell of the BS 220 in step 201. The device in the cell includes the BS 220 and ATs. That is, the BS 220 recognizes event occurrence, such as initialization of the BS 200, an access request of the ATs and the like.

Upon recognizing activation of the device in the cell, the BS 220 transmits a DEV_REG message to a DB server 210 in step 203. The DEV_REG message is a message for reporting activation of the device in the cell, and includes identification information on the activated device and information required to calculate EIRP of the activated device. The identification information may be one of a MAC address, a preset identifier and geo-location information on a device.

Upon receiving the DEV_REG message, the DB server 210 calculates an EIRP_Cap of the device, and transmits the calculated EIRP_Cap in step 205. The EIRP_Cap is a message including information regarding maximum allowed EIRP for each channel of the device, and may be configured as illustrated in Table 2 above. In other words, the EIRP_Cap includes the information regarding maximum allowed EIRP for each channel of the device, and includes identification information included in the DEV_REG message. In step 205, the DB server 210 registers information on a device indicated by the DEV_REG message to a list.

The DB server 210 recognizes changes in a spectrum condition stored in the DB server 210, that is, recognizes changes in radio resource scheduling information on a licensed system in step 207. For example, the scheduling information includes a band usage condition for each time period, a geo-location of devices of the licensed system using bands and the like.

Upon recognizing the changes in the spectrum condition, the DB server 210 recalculates an EIRP_Cap of each device registered in the list, and transmits the recalculated EIRP_Cap in step 209. In step 209, the number of transmitted EIRP_Cap messages varies depending on the number of devices registered in the list.

Upon receiving the recalculated EIRP_Cap, the BS 220 recognizes changes in information required to calculate EIRP of the device in the cell of the BS 220 while performing communication according to the recalculated EIRP_Cap in step 211. That is, the BS 220 recognizes changes in information on the BS 220 itself or receives changed information on the AT from the AT.

Upon recognizing changes in the information required to calculate the EIRP of the device, the BS 220 transmits a DEV_UPD message including the changed information related to EIRP calculation in step 213. The DEV_UPD message is a message for reporting changes in the information required to calculate the EIRP of the device in the cell and for providing changed information, and includes identification information on an activated device and the changed information related to EIRP calculation.

Upon receiving the DEV_UPD message, the DB server 210 recalculates an EIRP_Cap for the device, and transmits the EIRP_Cap in step 215. The EIRP_Cap includes the information regarding maximum allowed EIRP for each channel of the device and also includes identification information included in the DEV_REG message. In step 215, the DB server 210 does not transmit the EIRP_Cap according to whether the EIRP_Cap is changed. That is, to avoid unnecessary transmission of the EIRP_Cap, if the previously transmitted EIRP_Cap is identical to the recalculated EIRP_Cap, the DB server 210 does not transmit the recalculated EIRP_Cap. In association with transmission of the EIRP_Cap according to the DEV_UPD, the DB server 210 transmits the recalculated EIRP_Cap irrespective of whether the previously transmitted EIRP_Cap is identical to the recalculated EIRP_Cap. Further, the DB server 210 updates information on a device indicated by the DEV_UPD message.

Upon receiving the recalculated EIRP_Cap, the BS 220 recognizes deactivation of the AT in the cell of the BS 220 while performing communication according to the recalculated EIRP_Cap in step 217. For example, the BS 220 recognizes access release of the AT or connection loss in the cell. The access release implies power-off of the AT. The connection loss implies entering a mode in which communication is not performed for a long period of time.

Upon recognizing deactivation of the AT, the BS 220 transmits a DEV_DEREG message in step 219. The DEV_DEREG message is a message for reporting deactivate of the AT, and includes identification information on the deactivated AT. Accordingly, the DB server 210 deletes information on the AT indicated by the DEV_DEREG message from the list.

Figure 3:
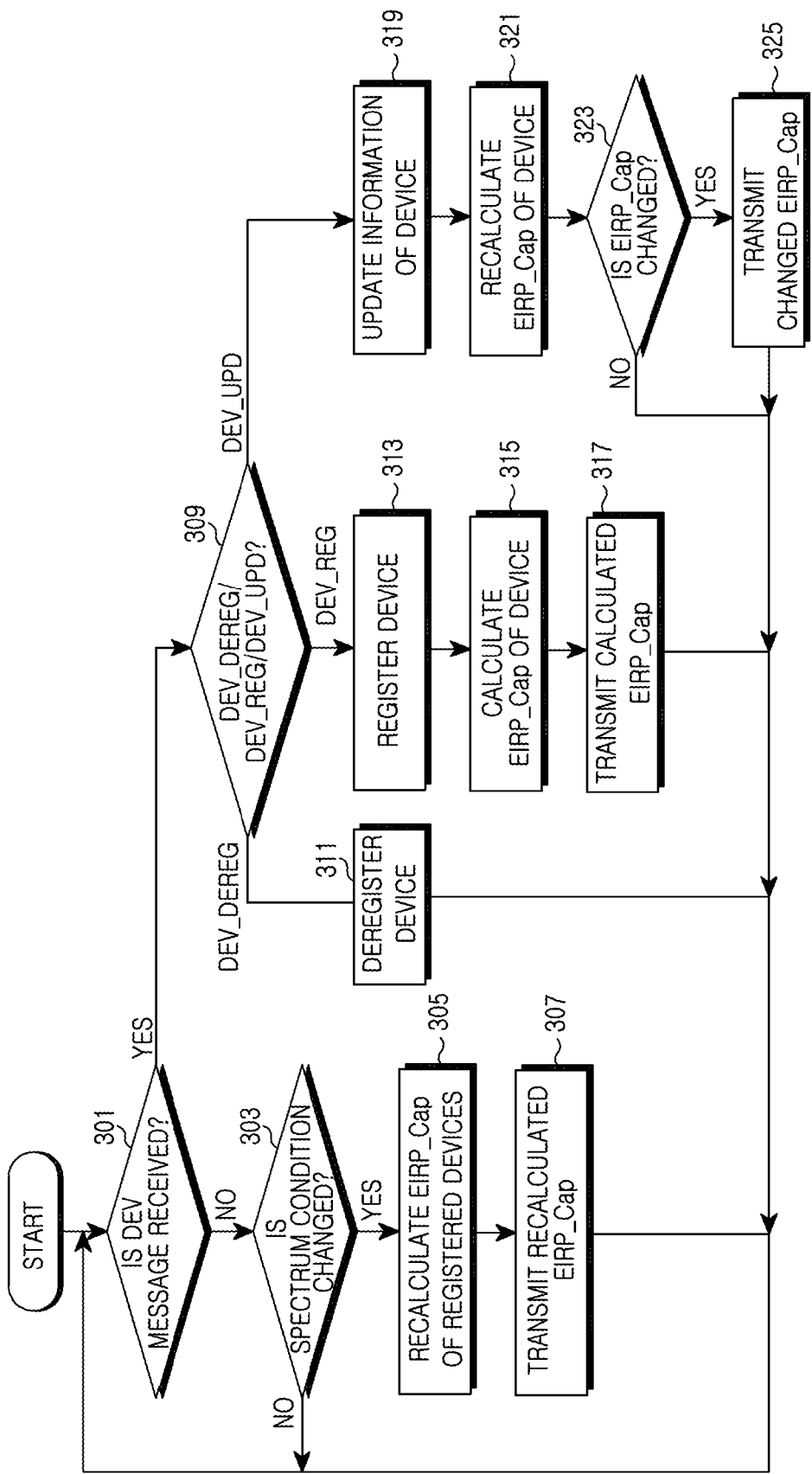
FIG. 3 is a flowchart illustrating an operation of a DB server in a CR-based wireless communication system according to an exemplary embodiment of the present invention.
Figure 4A:
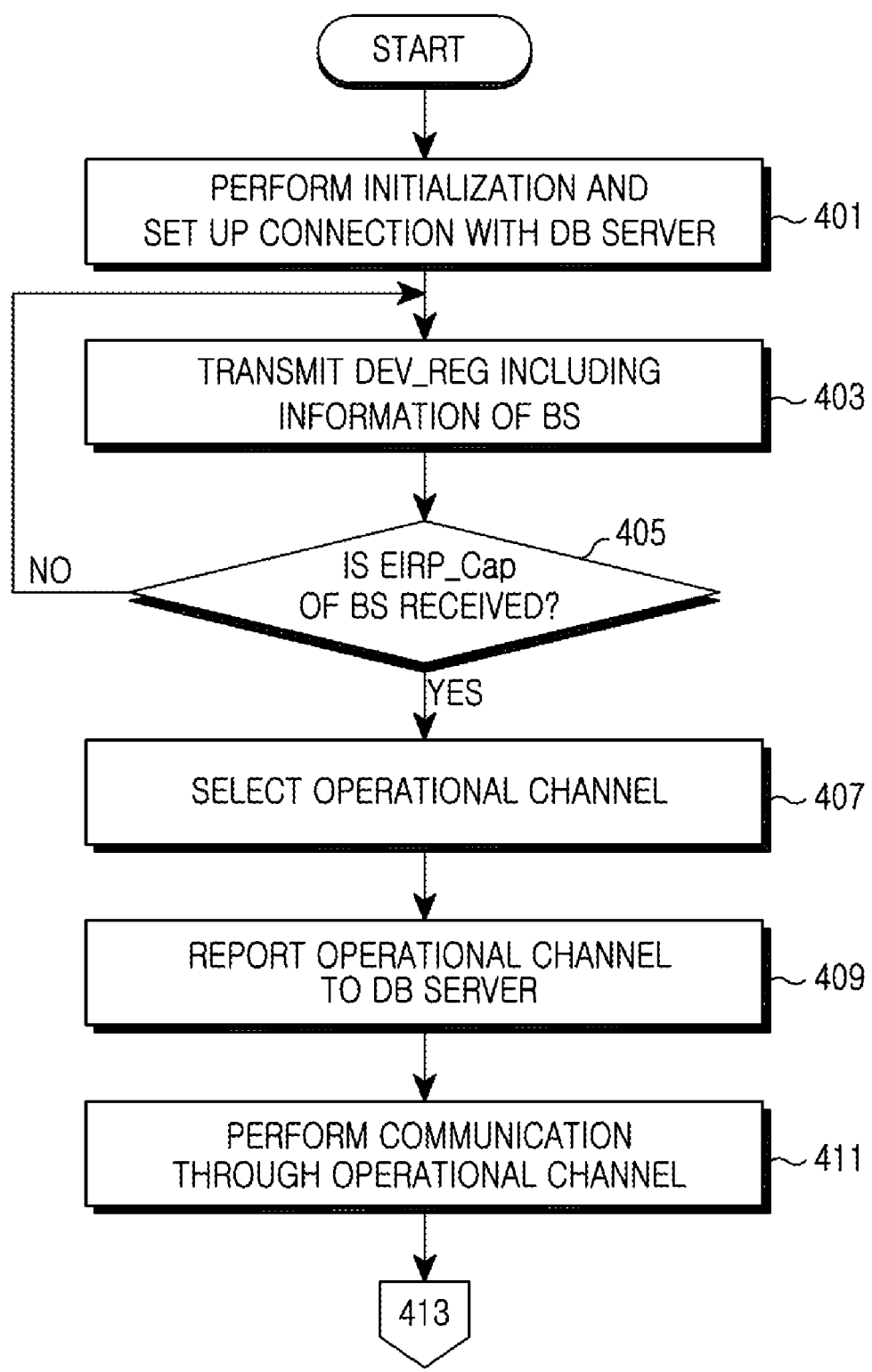
FIG. 4A to FIG. 4D illustrate a process for operating a BS in a CR-based wireless communication system according to an exemplary embodiment of the present invention.
Figure 4B:
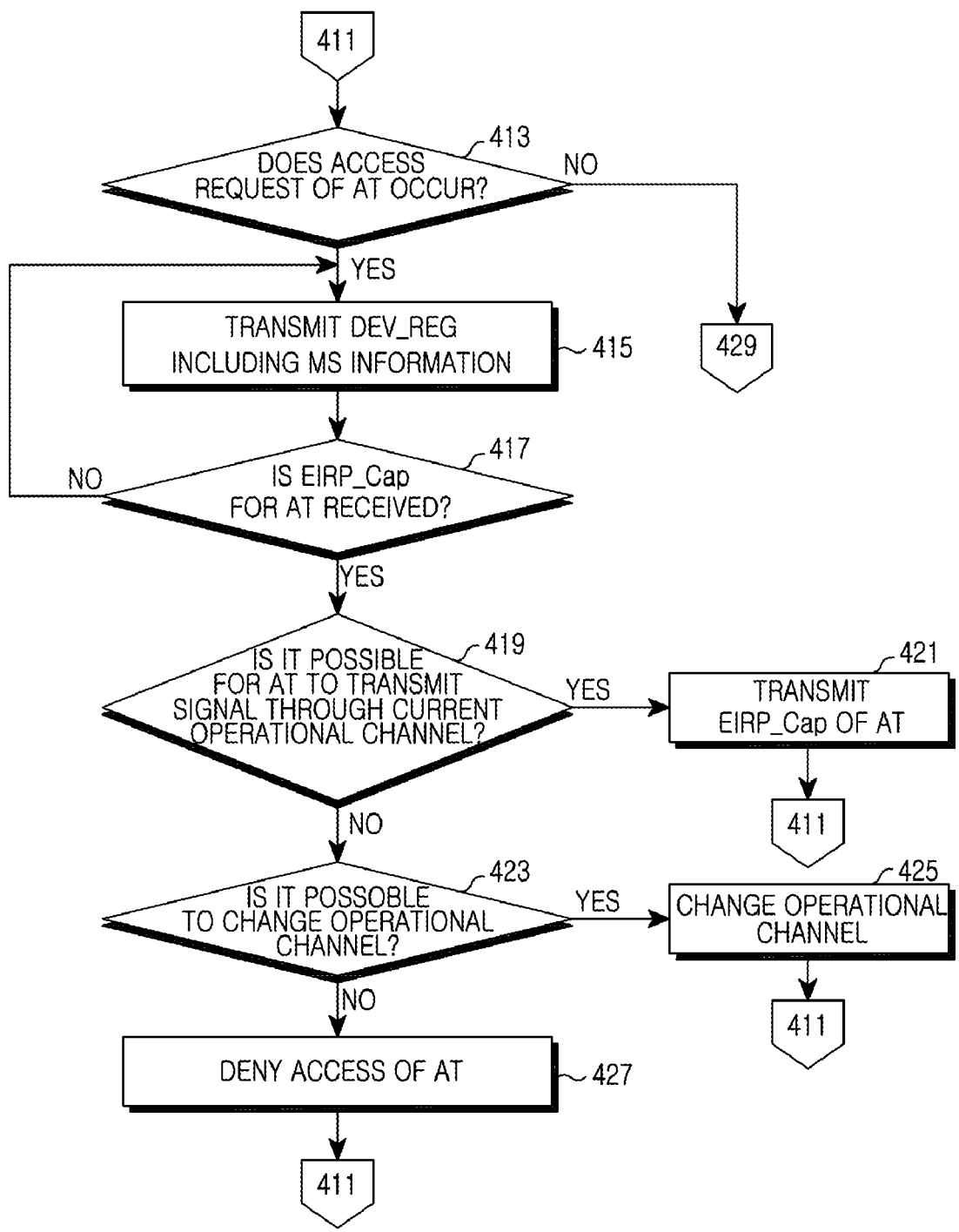
Figure 4C:
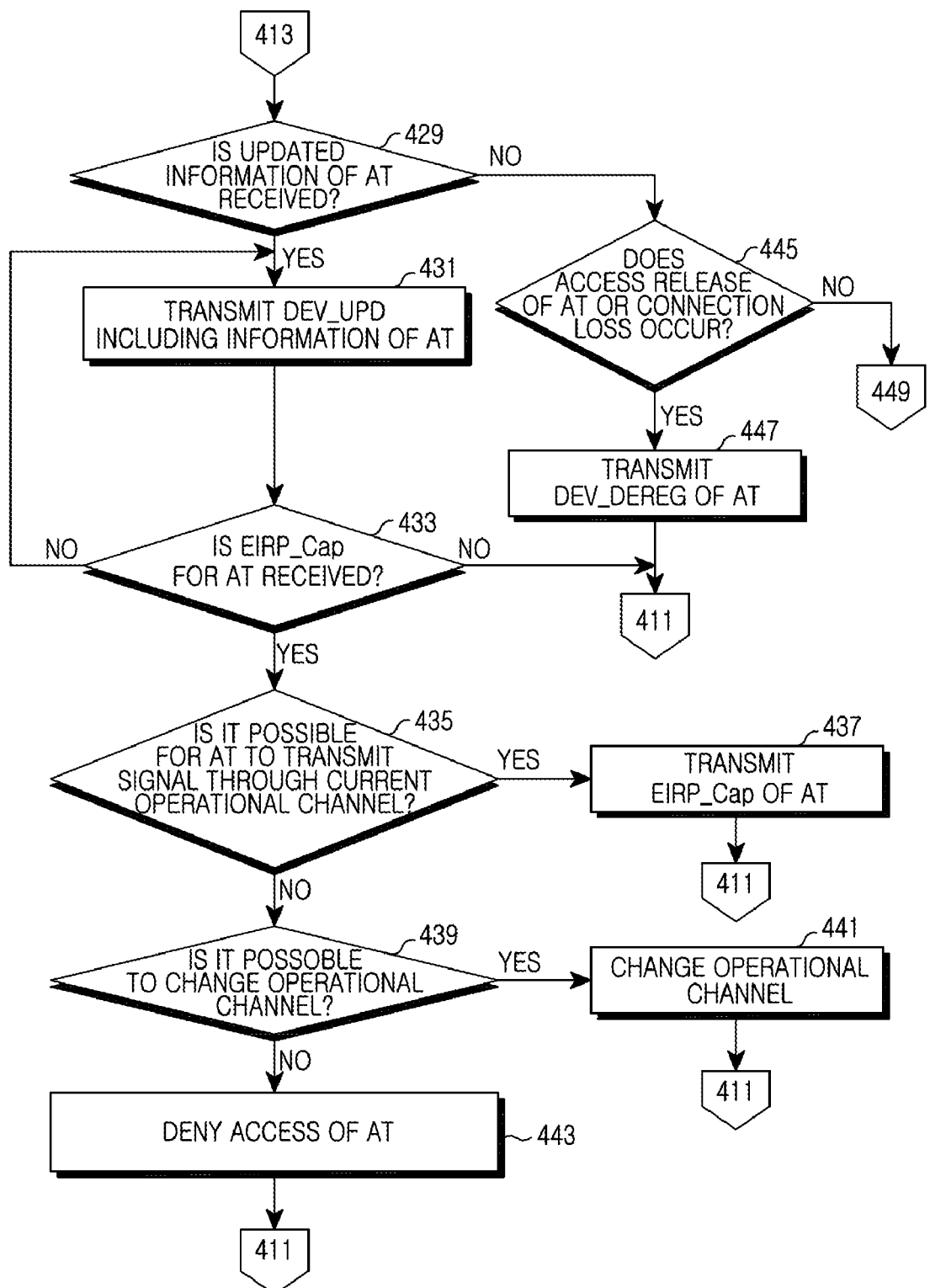
Figure 4D:
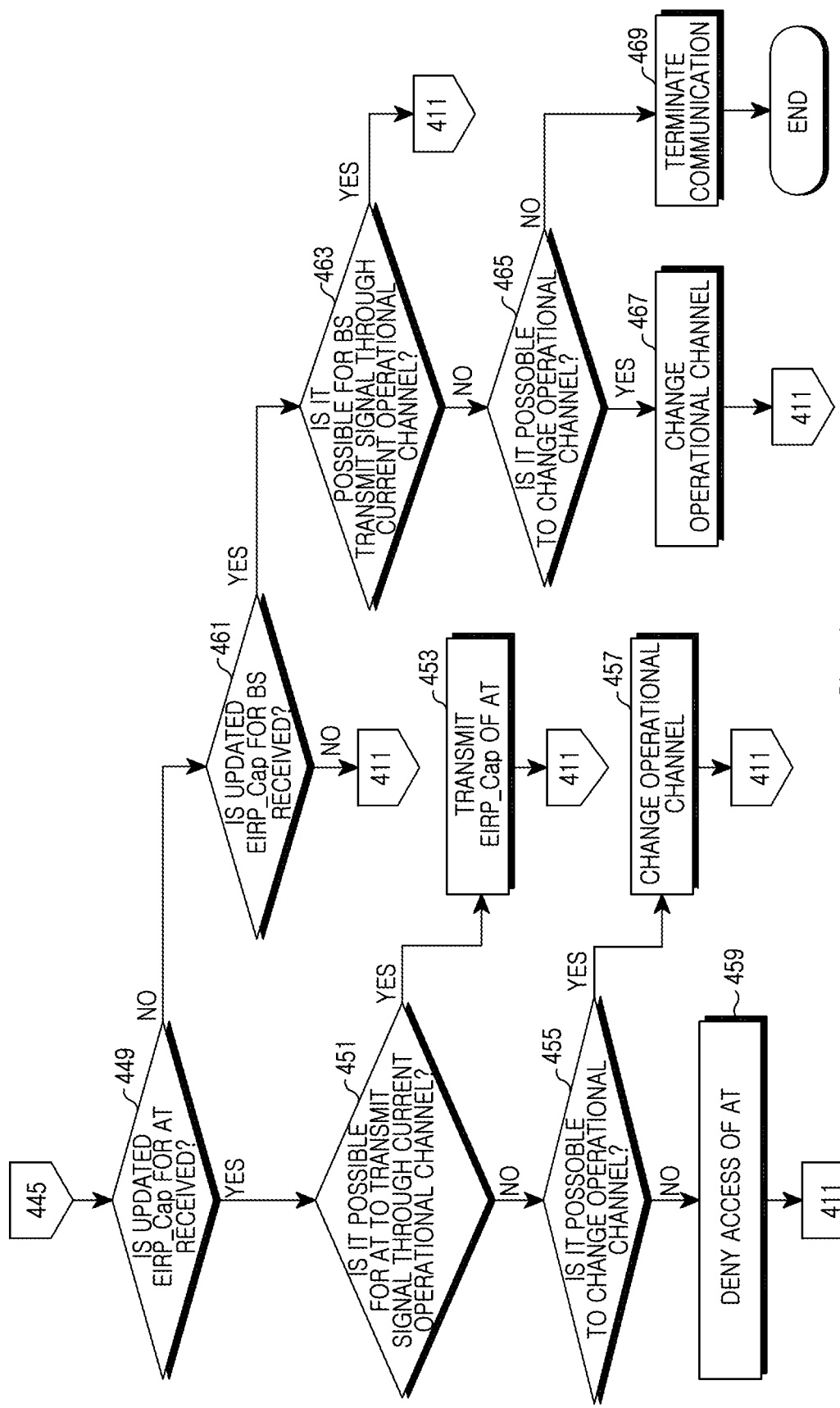

FIG. 3 is a flowchart illustrating an operation of a DB server in a CR-based wireless communication system according to an exemplary embodiment of the present invention.

Referring to FIG. 3, the DB server determines whether a DEV message is received in step 301. The DEV message is transmitted by a CR-based BS, and is a message used to report information on devices in a cell of the CR-based BS.

If the DEV message is not received, in step 303, the DB server determines whether a spectrum condition is changed. The spectrum condition implies radio resource scheduling information on a licensed system. The scheduling information includes a band usage condition for each time period, a geo-location of devices of the licensed system using bands and the like.

If the spectrum condition is changed, in step 305, the DB server recalculates an EIRP_Cap of each of registered CR-based devices. That is, the DB server recalculates the EIRP_Cap of each registered CR-based device by considering the changed spectrum condition.

After recalculating the EIRP_Cap of each registered CR-based device, in step 307, the DB server transmits the recalculated EIRP_Cap to BSs that manage the registered CR-based devices. In this case, the EIRP_Cap is configured as illustrated in Table 2 above.

If the DEV message is received in step 301, in step 309, the DB server determines the DEV message type. That is, the DB server determines whether the received DEV message is DEV_DEREG, DEV_REG, or DEV_UPD. The DEV_DEREG, the DEV_REG, and the DEV_UPD correspond to one CR-based BS (or AT). That is, the DEV_DEREG, the DEV_REG, and the DEV_UPD include identification information on one CR-based device. The identification information may be any one of a MAC address, an identifier and geo-location information on a device.

If the DEV message is the DEV_DEREG, in step 311, the DB server deregisters a device indicated by the DEV_DEREG message. That is, the DB server deletes information on the device indicated by the DEV_DEREG message from a stored list. Thereafter, the procedure returns to step 301.

If the DEV message is the DEV_REG, in step 313, the DB server newly registers a device indicated by the DEV_REG message. That is, the DB server stores information on the device indicated by the DEV_REG message to the list.

After newly registering the device, in step 315, the DB server calculates an EIRP_Cap of the newly registered device. In other words, the DB server calculates maximum allowed EIRP for each channel of the newly registered device.

After calculating the EIRP_Cap of the newly registered device, in step 317, the DB server transmits the calculated EIRP_Cap, and the procedure returns to step 301. In this case, the DB server transmits the EIRP_Cap to the BS whose cell includes the newly registered device.

If the DEV message is the DEV_UPD in step 309, in step 319, the DB server updates information on a device indicated by the DEV_UPD message. That is, the DB server updates the information on the device indicated by the DEV_UPD message to information included in the DEV_UPD message.

After updating the information on the device, in step 321, the DB server recalculates the EIRP_Cap of the device. In other words, the DB server recalculates maximum allowed EIRP for each channel of the newly registered device.

After recalculating the EIRP_Cap of the device, in step 323, the DB server compares the previously transmitted EIRP_Cap of the device with the recalculated EIRP_Cap. That is, the DB server determines whether the EIRP_Cap is changed according to updated information on the device.

If the EIRP_Cap is changed, in step 325, the DB server transmits the recalculated EIRP_Cap, and the procedure returns to step 301. In step 325, the DB server transmits the recalculated EIRP_Cap to the BS whose cell includes the device.

FIG. 4A to FIG. 4D illustrate a process for operating a BS in a CR-based wireless communication system according to an exemplary embodiment of the present invention.

Referring to FIG. 4A to FIG. 4D, the BS performs initialization and sets up a connection with a DB server in step 401. In other words, the BS executes programs required for an initial operation, and sets up the connection with the DB server according to a preset protocol.

In step 403, the BS transmits a DEV_REG message including information on the BS and required for EIRP calculation to the DB server. The DEV_REG message includes identification information on the BS. For example, the identification information may be one of a MAC address, an identifier and geo-location information on the BS.

After transmitting the DEV_REG message, in step 405, the BS determines whether an EIRP_Cap of the BS is received from the DB server. That is, the BS determines whether the EIRP_Cap including the identification information on the BS, i.e., information regarding maximum allowed EIRP for each channel, is received from the DB server.

If the EIRP_Cap of the BS is received, in step 407, the BS selects an operational channel by using the EIRP_Cap. In step 407, the BS may use the EIRP_Cap and spectrum scanning information. The number of operational channels varies depending on system configuration. That is, at least one operational channel may be provided.

After selecting the operational channel, in step 409, the BS reports the operational channel to the DB server. However, step 409 may be omitted according to system operators' intention.

In step 411, the BS performs communication through the operational channel. That is, the BS transmits a preamble and control information required for access of the AT through the operational channel according to a frame structure, and determines whether there is an AT that requests access to the BS.

In step 413, the BS determines occurrence of an access request of the AT. That is, the BS determines whether there is an AT that requests access to the BS according to a preset procedure. In step 413, information on the AT is required for EIRP calculation and is received together with the access request.

Upon occurrence of the access request of the AT, in step 415, the BS transmits a DEV_REG message including information required to calculate EIRP of the AT to the DB server. The DEV_REG message includes identification information on the AT. The identification information may be one of a MAC address, an identifier and geo-location information on the AT.

After transmitting the DEV_REG message, in step 417, the BS determines whether an EIRP_Cap for the AT is received. That is, the BS determines whether the EIRP_Cap including identification information on the AT, i.e., information regarding maximum allowed EIRP for each channel, is received from the DB server.

If the EIRP_Cap for the AT is received, in step 419, the BS determines whether it is possible for the AT to transmit a signal through the operational channel. That is, the BS determines whether it is possible for the AT to perform communication when transmit power is determined to satisfy maximum allowed EIRP for the operational channel according to the new EIRP_Cap. For example, if the transmit power determined to satisfy the maximum allowed EIRP is less than transmit power required by a minimum Modulation and Coding Scheme (MCS) level, the BS determines that communication may not be performed.

If it is possible for the AT to transmit the signal through the operational channel, in step 421, the BS transmits the EIRP_Cap for the AT to the AT. In other words, the BS transmits the EIRP_Cap received in step 417 for the AT to the AT. Thereafter, the procedure returns to step 411.

Otherwise, if it is not possible for the AT to transmit the signal through the operational channel, in step 423, the BS determines whether it is possible to change the operational channel. That is, the BS determines existence of back channels that may be used as another operational channel other than the current operational channel. Among the available back channels, the BS determines existence of a channel through which the AT may transmit the signal.

If it is possible to change the operational channel, in step 425, the BS changes the operational channel to a channel through which the AT may transmit the signal. Thereafter, the procedure returns to step 411.

Otherwise, if it is not possible to change the operational channel, in step 427, the BS denies access of the AT. Thereafter, the procedure returns to step 411.

If the access request of the AT has not occurred in step 413, in step 429, the BS determines whether updated information on the AT is received. That is, the BS determines whether updated information related to EIRP calculation is received from the AT currently performing communication.

If the updated information related to EIRP calculation is received, in step 431, the BS transmits a DEV_UPD message including the updated information required to calculate EIRP of the AT to the DB server. The DEV_UPD message includes identification information on the AT. The identification information may be one of a MAC address, an identifier and geo-location information on the AT.

After transmitting the DEV_UPD message, in step 433, the BS determines whether a new EIRP_Cap for the AT is received. That is, the BS determines whether the new EIRP_Cap including the AT identification information, i.e., information regarding maximum allowed EIRP for each channel, is received from the DB server.

If the new EIRP_Cap for the AT is received, in step 435, the BS determines whether it is possible for the AT to transmit a signal through the operational channel. That is, the BS determines whether it is possible for the AT to perform communication when transmit power is determined to satisfy the maximum allowed EIRP for the operational channel according to the new EIRP_Cap. For example, if the transmit power determined to satisfy the maximum allowed EIRP is less than transmit power required by the minimum MCS level, the BS determines that communication may not be performed.

If it is possible for the AT to transmit the signal through the operational channel, in step 437, the BS transmits the new EIRP_Cap for the AT to the AT. In other words, the BS transmits the new EIRP_Cap received in step 433 for the AT to the AT. Thereafter, the procedure returns to step 411.

Otherwise, if it is not possible for the AT to transmit the signal through the operational channel, in step 439, the BS determines whether it is possible to change the operational channel. That is, the BS determines existence of back channels that may be used as another operational channel other than the current operational channel. Among the available back channels, the BS determines existence of a channel through which the AT may transmit the signal.

If it is possible to change the operational channel, in step 441, the BS changes the operational channel to a channel through which the AT may transmit the signal. Thereafter, the procedure returns to step 411.

Otherwise, if it is not possible to change the operational channel, in step 443, the BS denies access of the AT. Thereafter, the procedure returns to step 411.

If the updated information is not received in step 429, in step 445, the BS determines occurrence of access release of the AT or connection loss. The access release implies power-off of the AT. The connection loss implies entering a mode in which communication is not performed for a long period of time.

If the access release of the AT or the connection loss occurs, in step 447, the BS transmits a DEV_DEREG message including information on the AT to the DB server. The DEV_DEREG message includes identification information on the AT. The identification information may be one of a MAC address, an identifier and geo-location information on the AT.

Otherwise, if the access release of the AT or the connection loss does not occur, in step 449, the BS determines whether an updated EIRP_Cap for the AT is received. That is, the BS determines whether the recalculated EIRP_Cap for the AT is received according to changes in a spectrum condition of the DB server.

If the updated EIRP_Cap for the AT is received, in step 451, the BS determines whether it is possible for the AT to transmit a signal through the operational channel. That is, the BS determines whether it is possible for the AT to perform communication when transmit power is determined to satisfy the maximum allowed EIRP for the operational channel according to the new EIRP_Cap. For example, if the transmit power determined to satisfy the maximum allowed EIRP is less than transmit power required by a minimum MCS level, the BS determines that communication may not be performed.

If it is possible for AT to transmit the signal through the operational channel, in step 453, the BS transmits the updated EIRP_Cap for the AT to the AT. In other words, the BS transmits the updated EIRP_Cap received in step 449 for the AT to the AT. Thereafter, the procedure returns to step 411.

Otherwise, if it is not possible for the AT to transmit the signal through the operational channel, in step 455, the BS determines whether it is possible to change the operational channel. That is, the BS determines existence of back channels that may be used as another operational channel other than the current operational channel. Among the available back channels, the BS determines existence of a channel through which the AT may transmit the signal.

If it is possible to change the operational channel, in step 457, the BS changes the operational channel to a channel through which the AT may transmit the signal. Thereafter, the procedure returns to step 411.

Otherwise, if it is not possible to change the operational channel, in step 459, the BS denies access of the AT. Thereafter, the procedure returns to step 411.

If the updated EIRP_Cap for the AT is not received in step 449, in step 461, the BS determines whether an updated EIRP_Cap for the BS is received. That is, the BS determines whether the recalculated EIRP_Cap for the BS according to changes in a spectrum condition of the DB server is received. If the updated EIRP_Cap for the BS is not received, the procedure returns to step 411.

If the updated EIRP_Cap for the BS is received, in step 463, the BS determines whether it is possible for the BS to transmit a signal through the current operational channel. If it is possible for the BS to transmit the signal through the current operational channel, the procedure proceeds to step 411.

Otherwise, if it is not possible for the BS to transmit the signal through the operational channel, in step 465, the BS determines whether it is possible to change the operational channel. That is, the BS determines existence of back channels that may be used as another operational channel other than the current operational channel. Among the available back channels, the BS determines existence of a channel through which the BS may transmit the signal.

If it is possible to change the operational channel, in step 467, the BS changes the operational channel to a channel through which the BS may transmit the signal. Thereafter, the procedure returns to step 411.

Otherwise, if it is not possible to change the operational channel, in step 469, the BS terminates communication. That is, the BS recognizes that there is no backup channel that may be used as the operational channel, and thus recognizes that communication may not be performed without interference with a licensed system, and then terminates communication.

Figure 5:
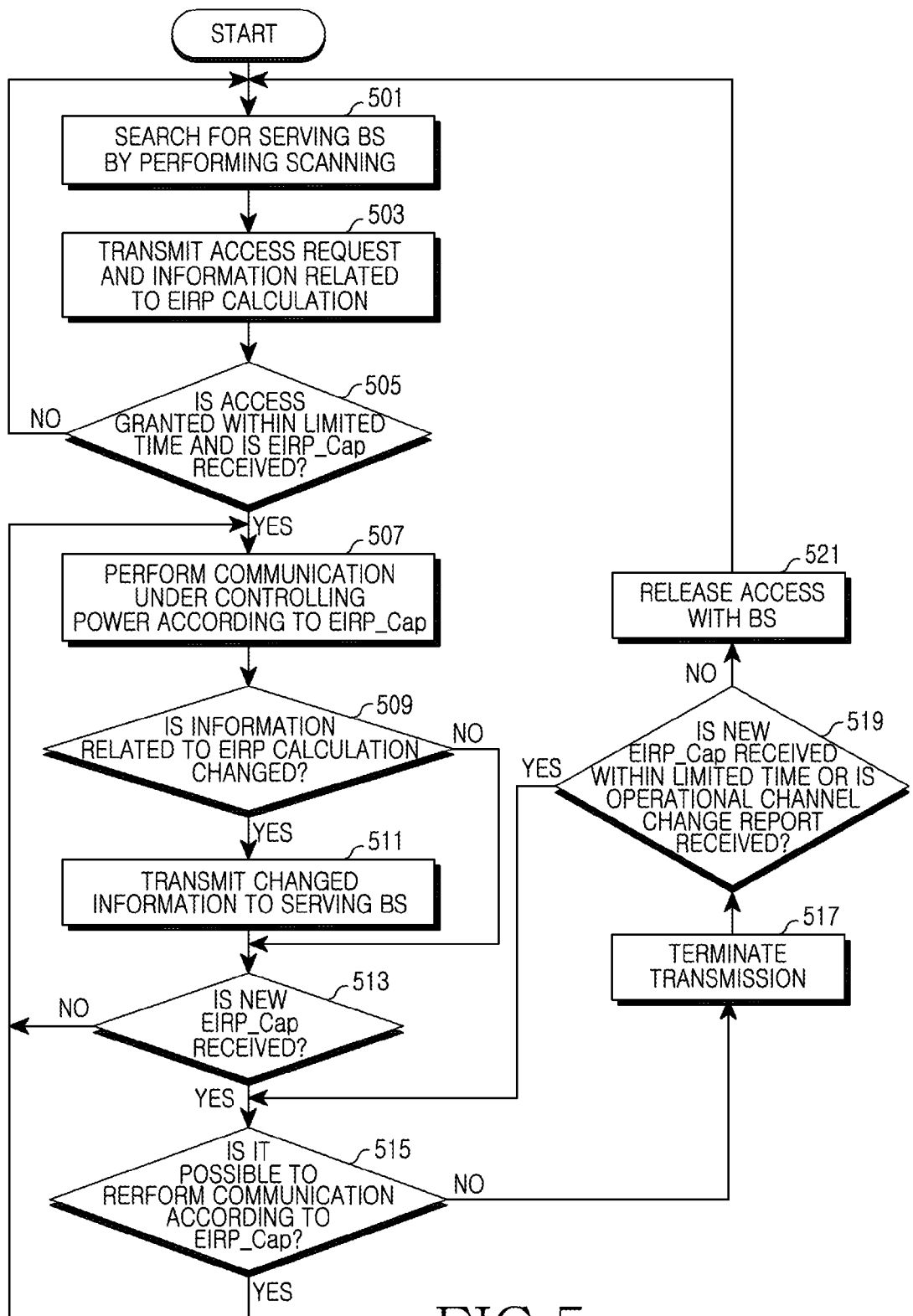
FIG. 5 is a flowchart illustrating a process for operating an Access Terminal (AT) in a CR-based wireless communication system according to an exemplary embodiment of the present invention.

FIG. 5 is a flowchart illustrating a process for operating an AT in a CR-based wireless communication system according to an exemplary embodiment of the present invention.

Referring to FIG. 5, the AT searches for a serving BS by performing scanning in step 501. That is, among a plurality of channels, the AT scans channels for receiving a signal transmitted from a BS. Then, the AT selects a BS having a channel with maximum received signal strength as the serving BS. The AT may use a preamble signal of the BS.

After the serving BS is determined, in step 503, the AT requests access to the selected serving BS, and transmits information required for EIRP calculation.

In step 505, the AT determines whether the access request is granted by the serving BS within a limited time and determines whether an EIRP_Cap is received. That is, the AT determines whether the access is granted and whether information regarding maximum allowed EIRP for each channel is received. If the access is denied, the procedure returns to step 501.

Otherwise, if the access is granted and the EIRP_Cap is received, in step 507, the AT performs communication under controlling power according to the received EIRP_Cap. That is, the AT performs communication by controlling transmit power without exceeding the maximum allowed EIRP for an operational channel of the serving BS.

In step 509, the AT determines whether information related to EIRP calculation is changed. That is, the AT determines whether information required for EIRP calculation is changed according to changes in a condition of the AT.

If the information required for EIRP calculation is changed, in step 511, the AT transmits the changed information to the serving BS.

Otherwise, if the information required for EIRP calculation is not changed, in step 513, the AT determines whether a new EIRP_Cap is received. In step 513, the new EIRP_Cap is an EIRP_Cap recalculated according to changes in the condition of the AT or an EIRP_Cap recalculated according to changes in a spectrum condition of the DB server. If the new EIRP_Cap is not received, the procedure returns to step 509.

If the EIRP_Cap is received, in step 515, the AT determines whether it is possible to perform communication according to the new EIRP_Cap. That is, the AT determines whether communication with the serving BS is possible when transmit power is determined to satisfy the maximum allowed EIRP for the operational channel according to the new EIRP_Cap. In other words, the AT determines whether minimum communication quality of the operational channel is satisfied when the transmit power is controlled according to the new EIRP_Cap. For example, the AT determines whether a required error rate is satisfied when the transmit power is determined to satisfy the maximum allowed EIRP. If communication is possible, the procedure returns to step 507.

Otherwise, if communication is not possible, in step 517, the AT terminates a transmission operation. That is, the AT terminates upstream communication and performs only downstream communication.

After terminating the transmission operation, in step 519, the AT determines whether the new EIRP_Cap is received within a limited time. That is, the AT determines whether the new EIRP_Cap recalculated according to changes in the spectrum condition of the DB server is received. If the EIRP_Cap is received within the limited time, the procedure returns to step 515 and the AT determines whether communication is possible.

Otherwise, if the EIRP_Cap is not received within the limited time, in step 521, the AT releases the access with the serving BS. Then, returning to step 501, the AT searches for a new serving BS.

Figure 6:
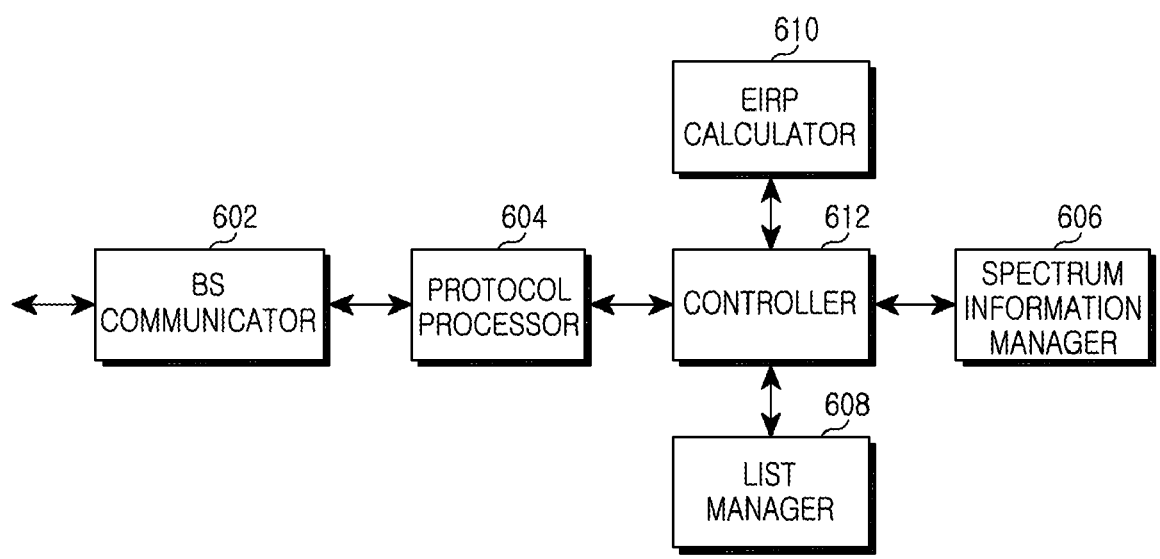
FIG. 6 is a block diagram illustrating a structure of a DB server in a CR-based wireless communication system according to an exemplary embodiment of the present invention.

FIG. 6 is a block diagram illustrating a structure of a DB server in a CR-based wireless communication system according to an exemplary embodiment of the present invention.

Referring to FIG. 6, the DB server includes a BS communicator 602, a protocol processor 604, a spectrum information manager 606, a list manager 608, an EIRP calculator 610 and a controller 612.

The BS communicator 602 provides an interface for performing communication with a BS. That is, the BS communicator 602 performs a function for performing conversion between an information bit-stream and a transmit/receive signal according to a communication method agreed between the DB server and the BS. If wireless communication is performed between the DB server and the BS, the BS communicator 602 includes an antenna.

The protocol processor 604 generates and analyzes a message according to a protocol used between the DB server and the BS. For example, the protocol processor 604 analyzes a DEV message received from the BS. The DEV message is a message for reporting activation/deactivation of CR-based devices or information change. The DEV message includes identification information on a device that intends to receive EIRP information, and may further include at least one of operation spectrum range information and antenna-related information. In an exemplary implementation, a format of the identification information may vary. For example, the identification information may be a MAC address, an identifier with an agreed format and geo-location information on a device. The DEV message may have a format as illustrated in Table 3 above. The protocol processor 604 analyzes an EIRP_Cap message including EIRP information to be transmitted to a CR-based BS. The EIRP_Cap message corresponds to one device, and includes device identification information and information regarding maximum allowed EIRP for each channel. For example, the EIRP_Cap message is configured as illustrated in Table 2 above.

The spectrum information manager 606 stores band scheduling information on a licensed system, and provides the band scheduling information to the controller 612. That is, the spectrum information manager 606 manages information indicating when and at which band a channel is used by the licensed system. Further, the spectrum information manager 606 stores geo-location information on the licensed system.

The list manager 608 manages a list of the CR-based BS and ATs. The list manager 608 additionally registers devices to the list according to a DEV_REG message received from the CR-based BS, updates information on the devices registered to the list according to a DEV_UPD message, and deletes devices registered to the list according to a DEV_DEREG message. The list includes device identification information and information required to calculate EIRP of devices.

The EIRP calculator 610 calculates maximum allowed EIRP for each channel of a CR-cased device. In other words, the EIRP calculator 610 uses a geo-location of the device and antenna-related information and thus calculates the maximum allowed EIRP for each idle channel to avoid interference with the licensed system. In this case, the EIRP calculator 610 manages geo-location and transmits power information on CR-based devices currently operating, and calculates the maximum allowed EIRP by considering a sum of interferences caused by a plurality of devices.

The controller 612 controls overall operations of the DB server. That is, the controller 612 provides information required for operations of different functional blocks, and controls operations of the different functional blocks. For example, the controller 612 provides the EIRP calculator 610 with geo-location information on a device that requires EIRP information, geo-location information regarding the licensed system and scheduling information on the licensed system. The controller 612 provides the protocol processor 604 with the maximum allowed EIRP for each channel and calculated by the EIRP calculator 610.

In this case, the controller 612 instructs the EIRP calculator 610 to calculate the EIRP when the following events occur. If a DEV_REG message is received, the controller 612 provides the EIRP calculator 610 and the list manager 608 with information required to calculate EIRP of the device and included in the DEV_REG message. Accordingly, the EIRP calculator 610 calculates the maximum allowed EIRP for each channel of the device, and the list manager 608 additionally registers information on the device to the list. If a DEV_UPD message is received, the controller 612 provides the EIRP calculator 610 and the list manager 608 with the information required to calculate the EIRP of the device and included in the DEV_UPD message. Accordingly, the EIRP calculator 610 recalculates the maximum allowed EIRP for each channel of the device, and the list manager 608 updates the information on the device to the list. If a spectrum condition of the licensed system is changed, the controller 612 provides the EIRP calculator 610 with information on devices stored in the list manager 608. Accordingly, the EIRP calculator 610 recalculates the maximum allowed EIRP for each channel of the device.

As described above, when the maximum allowed EIRP for each channel is calculated or recalculated, the controller 612 provides the protocol processor 604 with the calculated or recalculated EIRP information. Accordingly, the protocol processor 604 generates an EIRP_Cap message including the provided EIRP information, and the BS communicator 602 transmits the EIRP_Cap message to the BS. However, when the EIRP information is recalculated according to the DEV_UPD message, the controller 612 compares the recalculated EIRP information with previously transmitted EIRP information. If two pieces of EIRP information are identical, the controller 612 determines not to perform transmission. In addition, if a DEV_DEREG message is received, the controller 612 provides the list manager 608 with device identification information included in the DEV_DEREG message and deletes the device information from the list.

Figure 7:
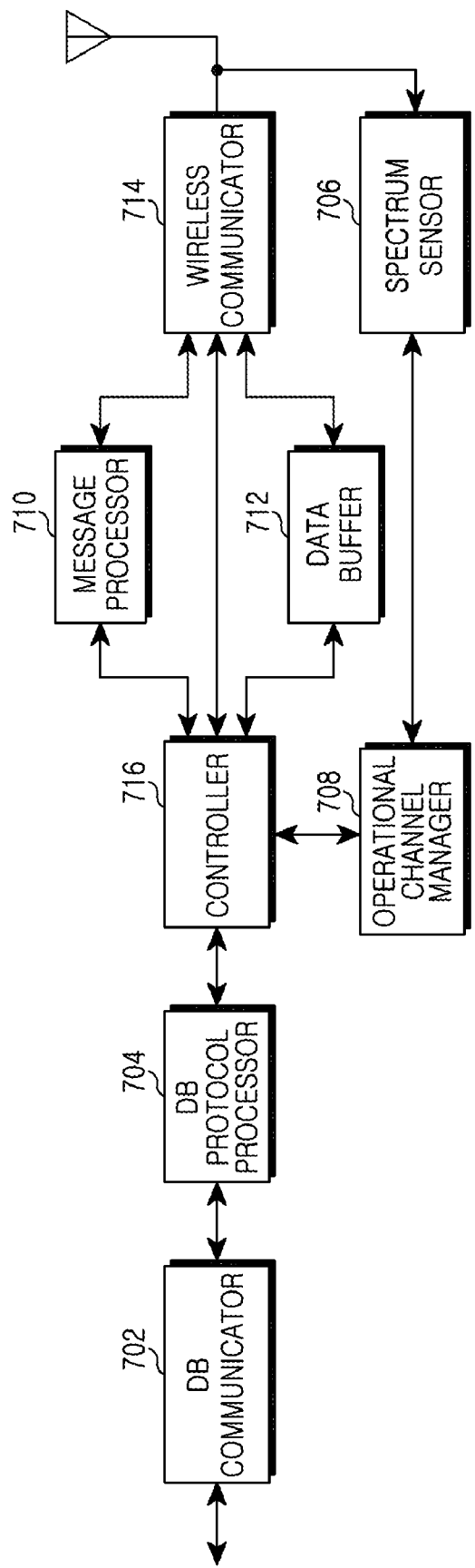
FIG. 7 is a block diagram illustrating a structure of a BS in a CR-based wireless communication system according to an exemplary embodiment of the present invention.

FIG. 7 is a block diagram illustrating a structure of a BS in a CR-based wireless communication system according to an exemplary embodiment of the present invention.

Referring to FIG. 7, the BS includes a DB communicator 702, a DB protocol processor 704, a spectrum sensor 706, an operational channel manager 708, a message processor 710, a data buffer 712, a wireless communicator 714, and a controller 716.

The DB communicator 702 provides an interface for performing communication with a DB server. That is, the DB communicator 702 performs a function for performing conversion between an information bit-stream and a physical signal according to a communication method agreed between the DB server and the BS. If wireless communication is performed between the DB server and the BS, the DB communicator 702 includes an antenna.

The DB protocol processor 704 generates and analyzes a message according to a protocol used between the DB server and the BS. For example, the DB protocol processor 704 generates a DEV message for reporting activation/deactivation of devices in a cell or information change to the DB server. The DEV message includes identification information on a device that intends to receive EIRP information, and may further include at least one of operation spectrum range information and antenna-related information. In an exemplary implementation, a format of the identification information may vary. For example, the identification information may be a MAC address, an identifier with an agreed format and geo-location information on a device. The DEV message may have a format of Table 3 above. The DB protocol processor 704 analyzes an EIRP_Cap message including EIRP information received from the DB server. The EIRP_Cap message includes device identification information and information regarding maximum allowed EIRP for each channel. For example, the EIRP_Cap message is configured as illustrated in Table 2 above.

The spectrum sensor 706 determines whether a signal of the licensed system is detected in all accessible bands. Further, the spectrum sensor 706 reports the detection result to the operational channel manager 708. The operational channel manager 708 stores the detection result provided from the spectrum sensor 706 and EIRP information provided from the DB server, and selects an operational channel by using the stored information.

The message processor 710 generates and analyzes a control message exchanged with ATs in the cell. For example, the message processor 710 generates and analyzes messages mutually agreed for an initial access process of the ATs, and generates a MAP message for reporting resource allocation information to the ATs. Further, the message processor 710 generates a message for delivering information regarding maximum allowed EIRP for each channel to the ATs.

The data buffer 712 stores data exchanged with the ATs and outputs data stored under the control of the controller 716. The wireless communicator 714 provides an interface for performing communication with the ATs. For example, the wireless communicator 714 codes and modulates a transmit bit-stream and converts the transmit bit-stream into complex symbols. Further, the wireless communicator 714 maps the complex symbols to subcarriers, converts the mapped complex symbols into a time-domain signal by performing an Inverse Fast Fourier Transform (IFFT) operation and configures a baseband OFDM symbol by inserting a Cyclic Prefix (CP). Thereafter, the wireless communicator 714 converts the baseband OFDM symbol into a Radio Frequency (RF) signal of the operational channel and transmits the RF signal through the antenna.

The controller 716 controls overall operations of the BS. That is, the controller 716 provides information required for operations of different functional blocks and controls operations of the different functional blocks. For example, the controller 716 controls the wireless communicator 714 to generate an RF signal corresponding to an operational channel band to communicate with the ATs in the cell. In addition, the controller 716 determines transmit power of the operational channel by using the maximum allowed EIRP for each channel. That is, the controller 716 determines the transmit power without exceeding the maximum allowed EIRP for the operational channel.

More particularly, the controller 716 controls a function for providing list management information and EIRP calculation information to the DB server. In the initialization of the BS, the controller 716 provides information required to calculate EIRP of the BS to the DB protocol processor 704. In addition, when information required to calculate EIRP of the AT is received at the access request of the AT, the controller 716 provides the information required to calculate the EIRP of the AT to the DB protocol processor 704. Accordingly, the DB protocol processor 704 generates a DEV_REG message including information on the BS or the AT, and the DB communicator 702 transmits the DEV_REG message to the DB server. Upon receiving the updated information related to EIRP calculation from the AT, the controller 716 provides the updated information related to EIRP calculation to the DB protocol processor 704. Accordingly, the DB protocol processor 704 generates a DEV_UPD message including updated information on the AT, and the DB communicator 702 transmits the DEV_UPD message to the DB server. In addition, when the access of the AT is released or when communication is terminated, the controller 716 reports the access release of the AT or the connection loss to the DB protocol processor 704. Accordingly, the DB protocol processor 704 generates a DEV_DEREG message including identification information on the AT, and the DB communicator 702 transmits the DEV_DEREG message to the DB server.

Upon receiving the EIRP information on the AT from the DB server, the controller 716 controls a function for transmitting the EIRP information to the AT. However, before transmission of the EIRP information on the AT, the controller 716 determines whether it is possible for the AT to transmit a signal through the current operational channel by using the received EIRP information on the AT. That is, the controller 716 determines whether it is possible for the AT to perform communication when transmit power is determined to satisfy maximum allowed EIRP for the operational channel according to the new EIRP_Cap. For example, if the transmit power determined to satisfy the maximum allowed EIRP is less than the transmit power required by a minimum MCS level, the controller 716 determines that communication may not be performed.

If it is possible for the AT to transmit the signal through the current operational channel, the EIRP information on the AT is transmitted to the AT under the control of the controller 716. On the other hand, if it is not possible for the AT to transmit the signal through the current operational channel, the controller 716 determines whether it is possible to change the operational channel so that the AT may transmit the signal. That is, the controller 716 controls the operational channel manager 708 to determine existence of back channels that may be used as another operational channel other than the current operational channel and to determine existence of a channel through which the AT may transmit the signal among the available back channels. If the determination result shows that it is possible to change the operational channel, the controller 716 changes the operational channel. If it is not possible to change the operational channel, the controller 716 denies or releases the access of the AT. That is, if the EIRP information is provided according to the DEV_REG message by the access request of the AT, it is determined that the access of the AT is denied. If the EIRP information is provided according to changes in the spectrum condition or according to the DEV_UPD message depending on changes in information on the AT, it is determined that the access of the AT is released.

Upon receiving EIRP information on the BS, the controller 716 determines whether it is possible for the BS to transmit a signal through the current operational channel. If it is possible for the BS to transmit the signal through the current operational channel, the controller 716 performs communication according to the received EIRP information. On the other hand, if it is not possible for the BS to transmit the signal through the current operational channel, the controller 716 determines whether it is possible to change the operational channel so that the BS may transmit the signal. That is, the controller 716 controls the operational channel manager 708 to determine existence of back channels that may be used as another operational channel other than the current operational channel and to determine existence of a channel through which the BS may transmit the signal among the available back channels. If the determination result shows that it is possible to change the operational channel, the controller 716 changes the operational channel. If it is not possible to change the operational channel, the controller 716 determines to terminate communication.

Figure 8:
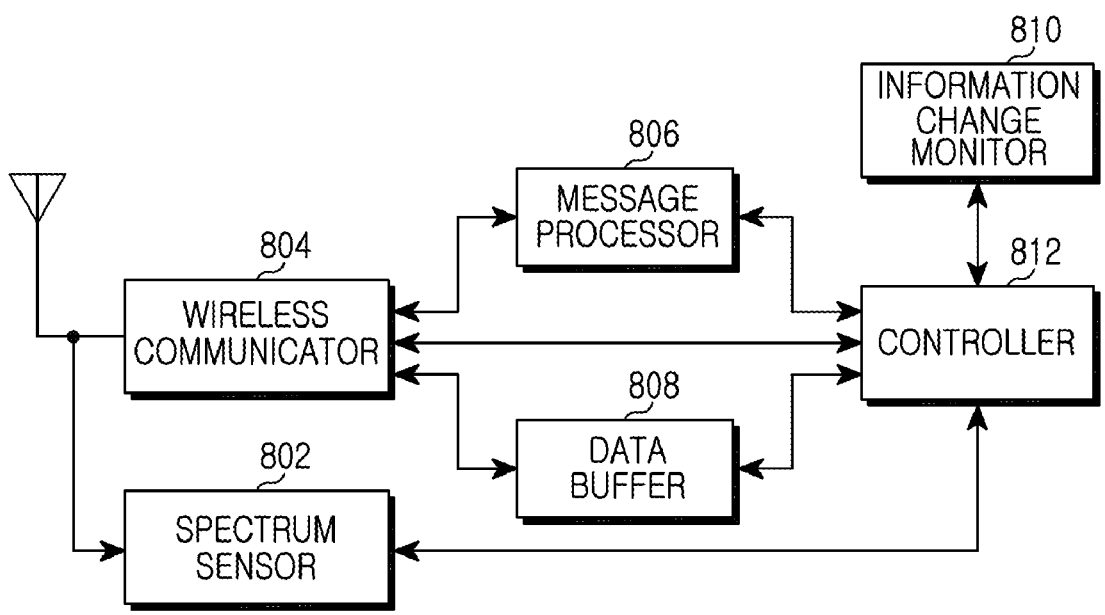
FIG. 8 is a block diagram illustrating a structure of an AT in a CR-based wireless communication system according to an exemplary embodiment of the present invention.

FIG. 8 is a block diagram illustrating a structure of an AT in a CR-based wireless communication system according to an exemplary embodiment of the present invention.

Referring to FIG. 8, the AT includes a spectrum sensor 802, a wireless communicator 804, a message processor 806, a data buffer 808, an information change monitor 810 and a controller 812.

The spectrum sensor 802 determines whether a signal of a licensed system is detected in all accessible bands. Further, the spectrum sensor 802 reports the detection result to the controller 812.

The wireless communicator 804 provides an interface for performing communication with ATs. For example, the wireless communicator 804 codes and modulates a transmit bit-stream and converts the transmit bit-stream into complex symbols. Further, the wireless communicator 804 maps the complex symbols to subcarriers, converts the mapped complex symbols into a time-domain signal by performing an IFFT operation, and then configures a baseband OFDM symbol by inserting a CP. Thereafter, the wireless communicator 804 converts the baseband OFDM symbol into an RF signal of an operational channel and transmits the RF signal through an antenna. In this case, the wireless communicator 804 controls transmit power without exceeding maximum allowed EIRP.

The message processor 806 generates and analyzes a control message exchanged with the BS. For example, the message processor 806 generates and analyzes messages mutually agreed for an initial access process of the ATs, and analyzes a MAP message including the resource allocation information. More particularly, at the initial access request, the message processor 806 generates a message including information related to EIRP calculation. Further, the message processor 806 analyzes a message including information regarding maximum allowed EIRP for each channel and received from the BS. The data buffer 808 temporarily stores data exchanged with the BS and outputs the stored data under the control of the controller 812.

The information change monitor 810 monitors whether information required to calculate EIRP of the AT is changed. That is, the information related to EIRP calculation is used to monitor physical changes in the antenna, i.e., changes in an antenna height, an antenna directivity, replacement of the antenna, location change of the BS and the like. If the information required to calculate the EIRP of the AT is changed, the information change monitor 810 provides the changed information to the controller 812.

The controller 812 controls overall operations of the BS. That is, the controller 812 provides information required for operations of different functional blocks and controls operations of the different functional blocks. For example, the controller 812 controls the wireless communicator 804 to up-convert a baseband signal to an RF signal corresponding to an operational channel band to perform communication with the BS. Further, the controller 812 determines transmit power in the operational channel by using the information regarding maximum allowed EIRP for each channel. That is, the controller 812 determines transmit power of the operational channel by using the maximum allowed EIRP for each channel.

When the information change monitor 810 recognizes the changes in the information required to calculate the EIRP of the AT, the controller 812 provides the changed information related to EIRP calculation to the message processor 806. Accordingly, the message processor 806 generates a message for reporting the changed information related to EIRP calculation to the BS, and the wireless communicator 804 transmits the message. Thereafter, upon receiving new EIRP information, the controller 812 determines a possibility of communication according to the new EIRP. That is, the controller 812 determines whether minimum communication quality of the operational channel is satisfied when the transmit power is controlled according to the new EIRP_Cap. If the determination result provides that communication is not possible, i.e., if minimum communication quality is not satisfied, the controller 812 terminates upstream communication. If new EIRP information or an operational channel change report is not received within a limited time, the controller 812 releases the access with the BS, and attempts access to another BS. Otherwise, if the new EIRP information or the operational channel change report is received within the limited time, the controller 812 re-determines the possibility of communication.

In the exemplary embodiments described above with reference to FIG. 1 to FIG. 8, the DB server calculates and provides maximum allowed EIRP for each channel, and the CR-based BS and ATs control transmit power according to the EIRP. Herein, the DB server provides the maximum allowed EIRP for each channel for exemplary purposes. Therefore, in an exemplary implementation, the DB server calculates and provides another type of information used to determine transmitter power. For example, the DB server directly calculates and provides transmit power allowed for each channel of the device. If the DB server provides transmit power information, similarly to providing EIRP information, a format of the transmit power information may vary. For example, the transmit power information may have at least one format among analog values of maximum transmit power allowed for each channel, binary values indicating operation availability in each channel, and enumeration values indicating operation availability in each channel and specific transmit power values.

According to exemplary embodiments of the present invention, whether a channel is used by a licensed system may be correctly determined by using a DB including band scheduling information on the licensed system in a CR-based wireless communication system. More particularly, channel condition information stored in the DB automatically reports a channel condition according to changes in a spectrum condition by the licensed system. Thus, the CR-based wireless communication system may accurately recognize changes in the channel condition.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Data Base (DB) server for storing spectrum condition information on a licensed system in a Cognitive Radio (CR)-based wireless communication system, the method comprising:

receiving a first message for reporting activation of a device in a cell of a CR-based Base Station (BS) from the CR-based BS;

calculating maximum allowed Equivalent Isotropically Radiated Power (EIRP) of the device for each channel; and transmitting a second message including information regarding the maximum allowed EIRP of the device for each channel.

2. The method of claim 1, further comprising:

registering information on the device included in the first message to a list.

3. The method of claim 1, further comprising:

receiving a third message including changed information required to calculate the EIRP of the device from the CR-based BS;

updating information on the device included in the third message to a list;

recalculating the maximum allowed EIRP of the device for each channel; and transmitting a fourth message including information regarding the recalculated maximum allowed EIRP of the device for each channel.

4. The method of claim 3, wherein the transmitting of the fourth message comprises:

comparing the information regarding the recalculated maximum allowed EIRP for each channel with previously transmitted information regarding maximum allowed EIRP for each channel; and if the information regarding the recalculated maximum allowed EIRP for each channel is different from the information regarding the previously transmitted maximum allowed EIRP for each channel, transmitting the for the message.

5. The method of claim 1, further comprising:

receiving a fifth message for reporting deactivation of the device from a CR-based BS; and deleting information on the device indicated by the fifth message from a list.

6. The method of claim 1, wherein the maximum allowed EIRP information comprises at least one format among analog values of maximum allowed EIRP for each channel, binary values indicating operation availability in each channel, and enumeration values indicating operation availability in each channel and specific EIRP values.

7. A method for operating a Base Station (BS) in a Cognitive Radio (CR)-based wireless communication system, the method comprising:

transmitting a first message including information for calculating maximum allowed Equivalent Isotropically Radiated Power (EIRP) of the BS to a Data Base (DB) server; and receiving a second message including information regarding maximum allowed EIRP of the BS for each channel from the DB server.

8. The method of claim 7, further comprising:

upon occurrence of an access request of an Access Terminal (AT), transmitting a third message including information required to calculate EIRP of the AT to the DB server; and receiving a fourth message including information regarding the maximum allowed EIRP of the AT for each channel from the DB.

9. The method of claim 7, further comprising:
upon occurrence of changes in the information required to calculate the EIRP of an Access Terminal (AT), transmitting a fifth message including the changed information related to EIRP calculation to the DB server; and
receiving a sixth message including information regarding the maximum allowed EIRP of the AT for each channel from the DB server.

10. The method of claim 7, further comprising:
upon occurrence of one of an access release of an Access Terminal (AT) and a connection loss, transmitting a seventh message for reporting deactivation of the AT to the DB server.

11. The method of claim 8, further comprising:
upon receiving the third message, determining whether it is possible for the AT to transmit a signal through at least one operational channel;
if it is possible for the AT to transmit the signal, transmitting the information regarding the maximum allowed EIRP of the AT for each channel to the AT;
if it is not possible for the AT to transmit the signal, changing the at least one operational channel to a backup channel through which the AT can transmit the signal; and
if the at least one operational channel cannot be changed to the backup channel through which the AT can transmit the signal, releasing or denying the access of the AT.

12. The method of claim 7, further comprising:
receiving an eighth message including updated information regarding the maximum allowed EIRP of the BS for each channel from the DB server;
determining whether it is possible for the BS to transmit a signal through the at least one operational channel;
if it is not possible for the BS to transmit the signal, changing the at least one operational channel to a backup channel through which the BS can transmit the signal; and
if the at least one operational channel cannot be changed to the backup channel through which the BS can transmit the signal, terminating communication.

13. The method of claim 7, wherein the maximum allowed EIRP information comprises at least one format among analog values of maximum allowed EIRP for each channel, binary values indicating operation availability in each channel, and enumeration values indicating operation availability in each channel and specific EIRP values.

14. A method for operating an Access Terminal (AT) in a Cognitive Radio (CR)-based wireless communication system, the method comprising:
controlling, by the AT, transmit power according to first information regarding maximum allowed Equivalent Isotropically Radiated Power (EIRP) for each channel received at initial access;
receiving, by the AT, second information regarding the maximum allowed EIRP for each channel without an additional request; and
controlling, by the AT, transmit power according to the second information regarding the maximum allowed EIRP for each channel.

15. The method of claim 14, further comprising:
determining, by the AT, whether minimum communication quality of the operational channel is satisfied when the transmit power is determined to satisfy the second information regarding the maximum allowed EIRP for each channel; and
if the minimum communication quality is not satisfied, terminating, by the AT, upstream communication and determining, by the AT, whether third information regarding the maximum allowed EIRP for each channel or an operational channel change report is received within a limited time; and
if the third information regarding the maximum allowed EIRP for each channel or the operational channel change report is not received within the limited time, releasing, by the AT, access with a Base Station (BS).

16. The method of claim 14, further comprising:
determining, by the AT, changes in information required to calculate an EIRP of the AT; and
transmitting, by the AT, the changed information required to calculate the EIRP of the AT to the BS.

17. A Data Base (DB) server apparatus for storing spectrum condition information on a licensed system in a Cognition Radio (CR)-based wireless communication system, the apparatus comprising:
a communicator for receiving a first message for reporting activation of a device in a cell of a CR-based Base Station (BS) from the CR-based BS, and, for transmitting a second message including information regarding Equivalent Isotropically Radiated Power (EIRP) of the device for each channel; and
a calculator for calculating the maximum allowed EIRP of the device for each channel.

18. The apparatus of claim 17, further comprising:
a list manager for registering information on the device included in the first message to a list.

19. The apparatus of claim 17,
wherein the communicator receives a third message including changed information required to calculate the EIRP of the device from a CR-based BS,
wherein the calculator recalculates the maximum allowed EIRP of the device for each channel, and
wherein the communicator transmits a fourth message including information regarding the recalculated regarding maximum allowed EIRP of the device for each channel,
wherein the apparatus further comprises a list manager for updating information on a device included in the third message from a list.

20. The apparatus of claim 19, wherein, if the information regarding the recalculated maximum allowed EIRP for each channel is different from previously transmitted information on the maximum allowed EIRP for each channel, the communicator transmits the fourth message.

21. The apparatus of claim 17,
wherein the communicator receives a fifth message for reporting deactivate of the device from a CR-based BS, further comprising:
a list manager for deleting information on a device indicated by the fifth message from a list.

22. The apparatus of claim 17, wherein the maximum allowed EIRP information comprises at least one format among analog values of maximum allowed EIRP for each channel, binary values indicating operation availability in each channel, and enumeration values indicating operation availability in each channel and specific EIRP values.

23. An apparatus for operating a Base Station (BS) in a Cognitive Radio (CR)-based wireless communication system, the apparatus comprising:

a Data Base (DB) communicator for transmitting a first message including information for calculating Equivalent Isotropically Radiated Power (EIRP) of the BS to a DB server; and a processor for confirming a second message including information regarding maximum allowed EIRP of the BS for each channel from the DB server.

24. The apparatus of claim 23, wherein, upon occurrence of an access request of an Access Terminal (AT), the DB communicator transmits a third message including information required to calculate EIRP of the AT to the DB server, and receives a fourth message including information regarding the maximum allowed EIRP of the AT for each channel from the DB.

25. The apparatus of claim 23, wherein, upon occurrence of changes in the information required to calculate the EIRP of the AT, the DB communicator transmits a fifth message including the changed information related to EIRP calculation to the DB server, and receives a sixth message including the information regarding the maximum allowed EIRP of the AT for each channel from the DB server.

26. The apparatus of claim 23, wherein, upon occurrence of one of an access release of the AT and a connection loss, the DB communicator transmits a seventh message for reporting deactivation of the AT to the DB server.

27. The apparatus of claim 24, further comprising:
a controller, upon receiving the third message, for determining whether it is possible for the AT to transmit a signal through at least one operational channel;

a wireless communicator for transmitting the information regarding the maximum allowed EIRP of the AT for each channel to the AT, if it is possible for the AT to transmit the signal; and a manager for changing the at least one operational channel to a backup channel through which the AT can transmit the signal if it is not possible for the AT to transmit the signal, wherein the controller releases or denies the access of the AT if the at least one operational channel cannot be changed to the backup channel through which the AT can transmit the signal.

28. The apparatus of claim 26, further comprising
a controller for determining whether it is possible for the BS to transmit a signal through the at least one operational channel upon receiving the updated information regarding the maximum allowed EIRP for each channel of the BS, wherein the manager changes the at least one operational channel to a backup channel through which the BS can transmit the signal if it is not possible for the BS to transmit the signal, and wherein the controller terminates communication if the at least one operational channel cannot be changed to the backup channel through which the BS can transmit the signal.

29. The apparatus of claim 23, wherein the maximum allowed EIRP information comprises at least one format among analog values of maximum allowed EIRP for each channel, binary values indicating operation availability in each channel, and enumeration values indicating operation availability in each channel and specific EIRP values.

30. An Access Terminal (AT) apparatus in a Cognitive Radio (CR)-based wireless communication system, the apparatus comprising:
a controller for controlling transmit power according to first information regarding maximum allowed Equivalent Isotropically Radiated Power (EIRP) for each channel and received at initial access; and a communicator for receiving second information regarding the maximum allowed EIRP for each channel without an additional request, wherein the controller controls transmit power according to the second information regarding maximum allowed EIRP for each channel.

31. The apparatus of claim 30, wherein, if minimum communication quality is not satisfied as a result of determining whether the minimum communication quality of the operational channel is satisfied when the transmit power is determined to satisfy the second information regarding the maximum allowed EIRP for each channel, the controller transmits upstream communication and determines whether third information regarding the maximum allowed EIRP for each channel or an operational channel change report is received within a limited time, and if the third information regarding the maximum allowed EIRP for each channel or the operational channel change report is not received within the limited time, the controller releases access with the BS.

32. The apparatus of claim 30, further comprising:
a monitor for determining changes in information required to calculate EIRP of the AT; and a processor for generating a control message for reporting the changed information required to calculate the EIRP of the AT.

33. The method of claim 1, further comprising:
determining changes in the spectrum condition information on the licensed system; and recalculating maximum allowed EIRP for each channel of CR-based devices registered in a list.

34. The method of claim 7, further comprising:
selecting at least one operational channel by using the information regarding the maximum allowed EIRP for each channel.

35. The apparatus of claim 17, wherein the controller determining changes in the spectrum condition information on the licensed system, and wherein the calculator for recalculating maximum allowed EIRP for each channel of CR-based devices registered in a list.

36. The method of claim 23, further comprising:
a manager for selecting at least one operational channel by using the information regarding the maximum allowed EIRP for each channel.

* * * * *